July 10, 1934.  O. B. CLARK  1,965,575
PLOW
Original Filed March 9, 1931  2 Sheets-Sheet 1
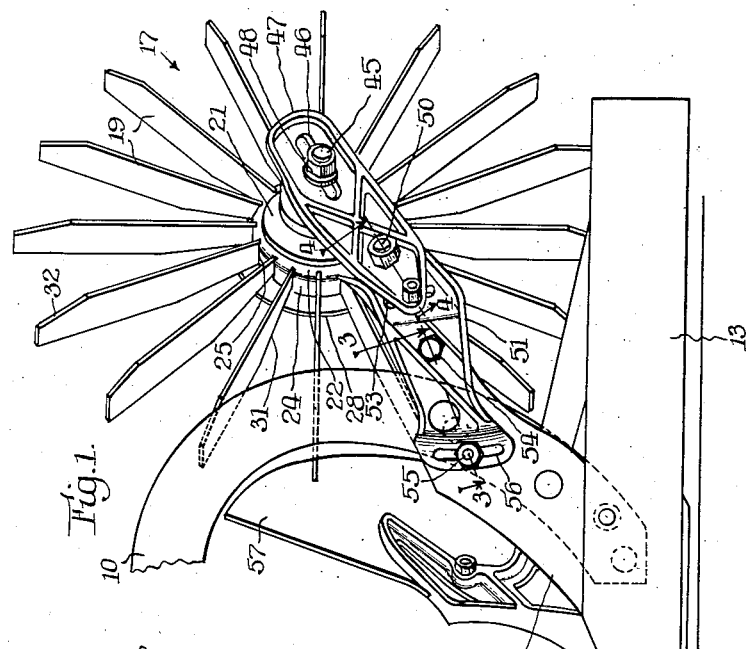
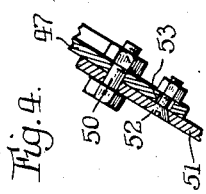
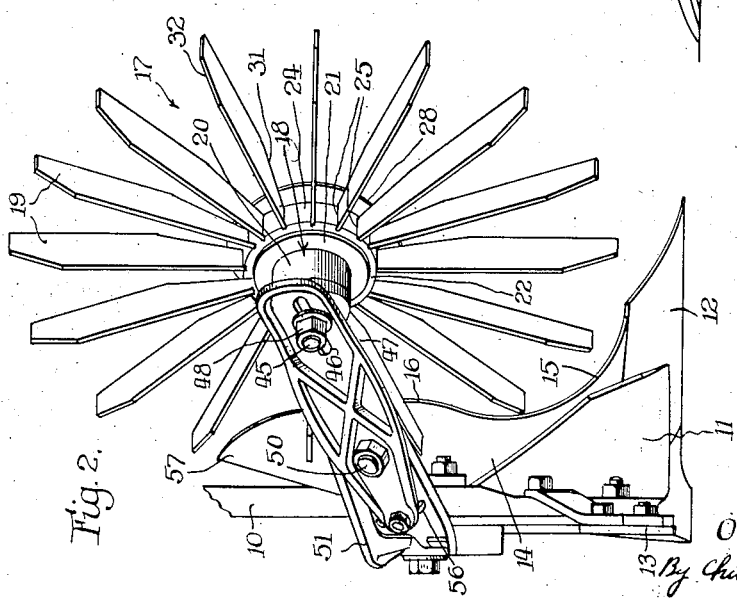
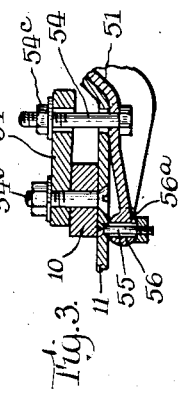
Inventor:
Otto B. Clark,
By Chindahl, Parker & Carlson
Attys.

July 10, 1934.   O. B. CLARK   1,965,575
PLOW
Original Filed March 9, 1931   2 Sheets-Sheet 2
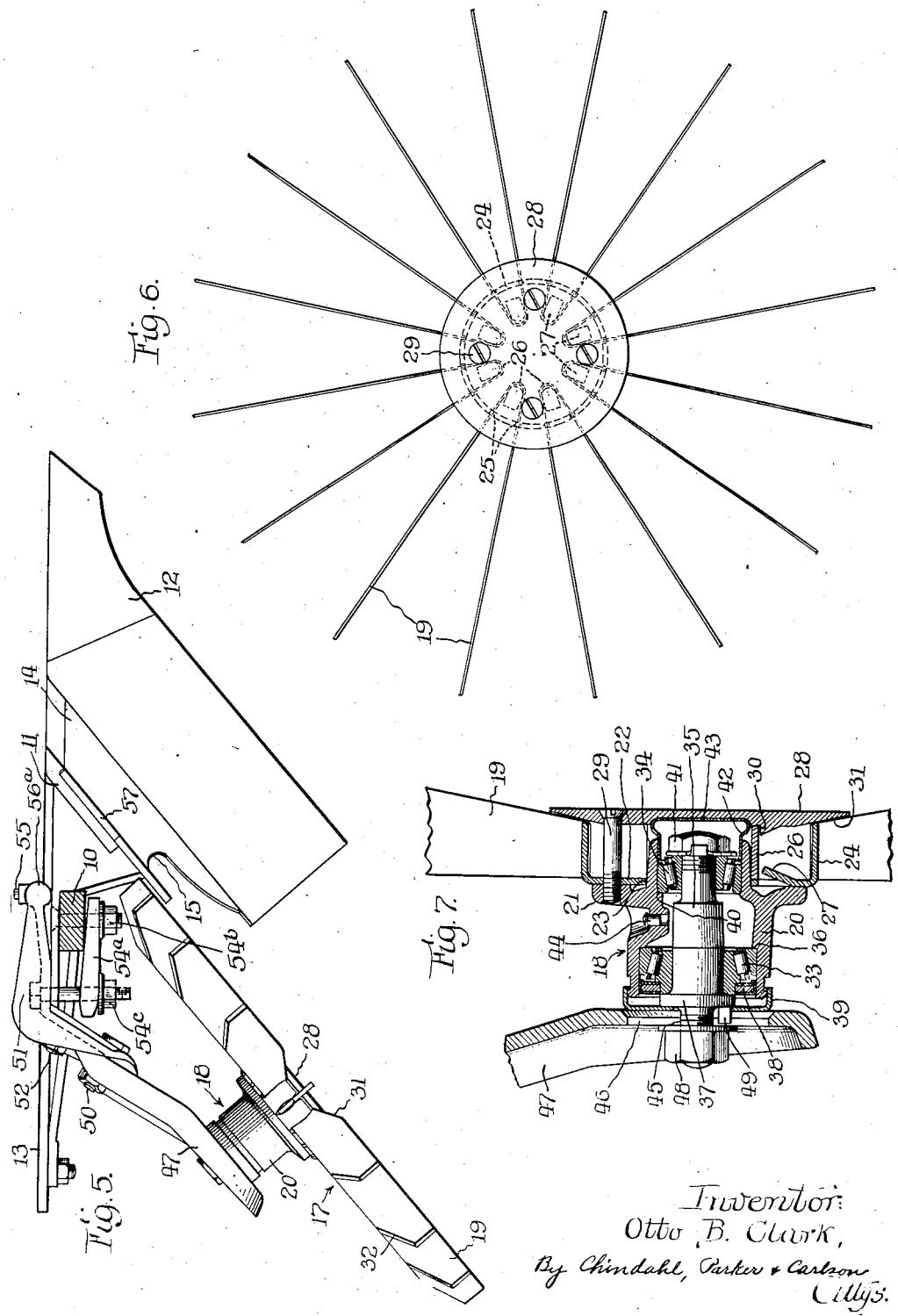
Inventor:
Otto B. Clark,
By Chindahl, Parker & Carlson
Attys.

Patented July 10, 1934

1,965,575

UNITED STATES PATENT OFFICE 1,965,575

PLOW

Otto B. Clark, Evansville, Ind., assignor, by mesne assignments, to Sherman Bros., Development Corporation, Evansville, Ind., a corporation of Indiana Application March 9, 1931, Serial No. 521,278
Renewed October 3, 1933

20 Claims. (Cl. 97—119)

The present invention relates to improvements in plows of the mold board type, and has particular reference to a new and improved plow bottom for turning and pulverizing a furrow slice.

Plows of the ordinary mold board type, while they act to break up the soil to some extent, serve primarily to turn over the soil, and hence leave a seed bed that is far from finished. Thus, top soil as well as trash and surface growth are turned down against the hard bottom of the furrow. This, together with the lapping of the furrow slices, forms dead air pockets. The plowed surface is usually rough and uneven, and the bed is not uniformly pulverized from top to bottom. Hence, various series of other operations by surface tools, such as harrows, drags, rollers or cultipackers, are necessary to produce the desired mulch. However, such operations require considerable time, and moreover it is difficult thereby to penetrate the bed with such tools sufficiently to break up the lumps and destroy the air pockets at the bottom.

Merely turning over the furrow slice, as is done with the standard mold board plow, locates the rich surface soil and the trash on the hard bottom of the furrow. As a result, the rotting of the trash is greatly retarded so that in many instances the trash forms a definite insulation preventing moisture in the sub-soil from passing up to the seed bed. Also, when plowing deeper than the layer of fertile soil, considerable unfertile sub-soil is brought to the surface, and reduces the productiveness of the field. Hence, deep tillage in shallow plowed fields although frequently desirable can only be accomplished gradually over a period of years since it is recognized that not more than an inch of unfertile sub-soil should be brought to the surface at one time.

Standard mold board plows are limited in their adaptation to different kinds of soils. Mold boards of different shapes and sizes must be provided for different plowing conditions, thus involving expense and inconvenience.

Various important objects of the invention therefore reside in the provision of a plow with a new and improved bottom which eliminates the foregoing objections, and which more specifically tends to accomplish the following:

(1) Thoroughly and uniformly disintegrates, agitates and aerates the soil to provide a fine mulch and a smooth top surface.

(2) Works from the bottom up, thus eliminating air pockets and bringing any chunks that may not be broken up to the surface where they can be readily worked.

(3) Deposits the bottom portion of the furrow slice, as it leaves the plow share, on the bottom of the furrow, thus permitting deep tillage without raising unfertile soil to the surface, and furthermore burying the trash and surface growth in the middle of the bed where it is readily decomposed.

(4) Produces a good seed bed quickly and economically, and one that requires very little additional preparation.

(5) Plows satisfactorily practically all kinds of soil intended for cultivation.

Other objects of the invention reside in the provision of a novel plow bottom which is simple and inexpensive in construction, which comprises an attachment adapted to be mounted on standard types of plows, which is adapted for use in one design in practically all kinds of soil, and is adjustable for different plowing conditions, and which is self-cleaning.

I accomplish the foregoing objects by substituting for the standard mold board, a rotary agitating member, preferably in the form of a substantially flat rimless wheel, positioned obliquely to act on the furrow slice and particularly on the bottom of the slice, and a deflector in the nature of an abbreviated mold board for directing the slice from the plow share to the member.

With particular reference to the agitating wheel, various objects of the invention reside in the provision of one or more of the following features:

(1) A wheel that requires no power drive, but is driven solely by the flow of the soil.

(2) So positioning the wheel relative to the share and the deflector that the furrow slice in moving obliquely into the adjacent furrow is caused to flow against the forward and lower portion of the wheel.

(3) Adjustability of the wheel in height to adapt same for plowing to different depths and also to regulate the speed of rotation, and angularly with respect to the flowing furrow slice to vary the degree of pulverization and also to adapt same to different kinds of soil with varying amounts and degrees of vegetation and moisture.

(4) Flexible spring blades on the wheel to prevent breakage upon impact with rocks, dense trash and other obstructions, to cause greater spraying or kicking of the soil, and to improve the self-cleaning properties of the wheel.

Still another object resides in the provision of novel shield means overlapping the front edge of the wheel to prevent the soil or trash from engaging the blades until the latter in their lower course of movement near approximately the vertical center line, and particularly to prevent the trash from jamming against the hub between the blades.

Further objects and advantages will become apparent as the description proceeds.

In the accompanying drawings, Figure 1 is a side elevational view of a plow embodying the features of my invention.

Fig. 2 is a rear end elevation.

Fig. 3 is a sectional detail view on an enlarged scale taken along line 3—3 of Fig. 1.

Fig. 4 is a sectional detail view on an enlarged scale taken along line 4—4 of Fig. 1.

Fig. 5 is a plan view.

Fig. 6 is a front face view on an enlarged scale of the wheel.

Fig. 7 is a fragmentary axial sectional view of the wheel.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the plow constituting the exemplary embodiment of the invention comprises a beam 10 and a frog 11 attached to the lower end of the beam. A plow share 12 and a landslide 13 are secured to opposite sides of the frog 11.

Mounted on the frog 11 immediately back of and continuing in an accelerated manner the lifting and turning curve of the share 12 to a limited extent is an upstanding deflector 14. The rear edge of the deflector 14 is formed with an S curve having a lower concave portion 15 and an upper convex portion 16. Upon drawing the plow through the soil, the share 12 cuts and lifts the furrow slice, and in lifting the slice initiates turning over of the slice. The slice is directed across the lower portion of the deflector 14 which in part replaces the standard mold board (not shown), and in the course of this movement is virtually turned on edge diagonally of the adjacent furrow into which it is to be deposited.

Mounted in position to act on the diagonal turning furrow slice as it leaves the deflector 14 is a rotary member 17 which is formed to agitate and pulverize the soil. While within the broad concept of the invention, the member 17 may be provided in various forms, preferably it has foraminations and cutting elements, and to this end more specifically comprises a rimless wheel with a central hub 18 and peripheral spokes 19. In the present instance, the spokes 19 consist of flat radial blades disposed at the lower course of their rotary movement in the path of a furrow slice.

The blades 19 are securely and removably anchored to the hub 18 which comprises a bearing sleeve 20 formed intermediate its ends with an external peripheral flange 21. An anchor disk 22 with a central opening 23 receiving the outer end of the sleeve 20 is positioned against the outer face of the flange 21 and is formed with an annular peripheral flange 24 extending forwardly in concentric relation to the hub. Formed in the flange 24 and opening to the free edge thereof are a plurality of equally spaced transverse slots 25 through which the blades 19 extend. The blades 19 are formed in adjacent pairs out of a plurality of bars bent acutely midway of their ends as indicated at 26, the V-shaped bends 26 being confined within the flange 24.

Struck in from the disk 22 into engagement with the insides of the bends 26 are a plurality of lugs 27, one for each bend, for holding the inner ends of the blades 19 rigidly and securely against the sleeve 20. A central hub plate 28 is positioned over the front of the flange 24 and against the front edges of the inner ends of the blades 19, and is secured to the flange 21 by means of a plurality of bolts 29, thus holding the various parts of the wheel 17 in assembled relation. A plurality of lugs 30 are formed on the inner face of the hub plate 28 in opposed relation to the lugs 27 to supplement the latter by engaging in the front margins of the bends 26.

Preferably, the blades 19 are made of hardened spring steel so that they are subject to flexure, thus preventing damage or breakage upon engaging rocks, excessive trash or other impediments, and moreover imparting thereto a snap or kick tending to increase the spraying or spreading action of the wheel 17 on the soil. The hub 18 is relatively small in size, and of the blades 19, the front edges are beveled at their inner ends as indicated at 31 to define a central generally concave area in the front face of the wheel, and the rear edges are beveled at their outer ends as indicated at 32, this construction, particularly when the blades are resilient, serving to increase the self-cleaning properties of the wheel.

The wheel 17 may be mounted on the plow in any desired manner, and in the present instance the hub sleeve 20 is mounted on antifriction bearings 33 and 34 on the ends of a stub shaft 35. The inner bearing 33 is disposed in a seat 36 formed in the inner end of the sleeve 20 and against a peripheral flange 37 on the shaft 35 and is sealed against the entrance of dirt and foreign matter by means of a ring packing 38. To further protect the bearing 33, a seal ring 39 is secured against the flange 37 and telescopes over the inner end of the sleeve 20 so as to enclose the packing 38. The outer bearing 34 is disposed in a seat 40 formed in the front end of the sleeve 20 and is held in position by a nut 41 threaded onto the forward end of the shaft 35. A cap 42 fitting snugly in the outer end of the sleeve 20 and in a recess 43 formed in the inner face of the hub plate 28 serves to enclose the bearing 34 against the entrance of dirt, grit and foreign matter. The interior of the sleeve 20 is adapted to serve as an oil reservoir, a normally closed oil supply fitting 44 being provided in its wall.

The rear end of the shaft 35 has a threaded stud 45 which extends through an elongated slot 46 formed longitudinally in the free outer end of a supporting arm 47, and is adapted to be clamped in position of adjustment by means of a nut 48, with the seal ring 39 against the front side of the arm, to support the wheel 17. A pin 49 on the flange 37 extends into the slot 46 to hold the shaft 35 against rotation.

The arm 47 is slightly inclined upwardly and rearwardly, and extends diagonally of the vertical longitudinal plane of the plow, and is pivotally mounted adjacent its lower end on a bolt 50 on the rear end of a bracket 51. The bracket 51 is slightly inclined upwardly and rearwardly longitudinally of the plow, and the rear end is formed obliquely into alignment with the arm 47. A headed clamp bolt 52 extending through the lower end of the arm 47 and a generally transverse arcuate slot 53 in the bracket 51 serves to secure the arm in different angular positions of adjustment.

The bracket 51 is pivotal midway of its ends on a pivot bolt 54 on the vertical side of the frog 11. The bolt 54 is threaded into the bracket 51 and extends through a clip 54a rigidly secured to the beam 10 by a bolt 54b, and is adapted to be adjusted longitudinally by means of a nut 54c to adjust the angular disposition of the bracket about a vertical axis. A clamp bolt 55 anchored in the frog 11 extends through an arcuate slot 56 in the front rounded end 56a of the bracket 51 and is adapted to clamp the bracket in different angular positions of adjustment. The rounded end 56a provides in effect a bearing for pivotal adjustment about a vertical axis. When the nut 54c is loosened, the pressure of the soil on the wheel 17 will tilt the bracket 51 about the end 56a away from the frog 11 to the desired angle.

Thus, the shaft 35, the arm 47 and the bracket 51 constitute means for adjusting the position of the wheel 17 vertically and angularly. The height adjustment obviously permits the wheel 17 to be mounted for different depths of plowing. The angular adjustment permits changing of the vertical angle about the bolt 50 and/or the bolt 54 or the horizontal angle about the bracket end 56a of the wheel 17 with respect to the flowing furrow slice so as to control the degree of pulverization and also to set the wheel in position for the most efficient use in various kinds of soils and under different soil conditions. The horizontal angle controls the degree of pulverization. The vertical angle affects the speed of rotation of the wheel 17, and the adaptability of the wheel for proper and efficient operation in different kinds of soil.

Positioned over the deflector 14 is a shield 57 which overlaps the front margin of the wheel 17 to prevent trash from packing against the hub 18 between the blades 19, and in general to prevent soil and trash from engaging the ends of the blades 19 until they are well along in their lower course of movement. Preferably, the shield 57 is formed integral with the upper end of the deflector 14, the lower portion of the combined parts serving to handle the soil proper of the furrow slice. The wheel 17 may be adjusted along the slot 46 to vary the degree of overlap with the shield 57 and also to adjust the extent to which the wheel will project into the furrow slice.

In use, the wheel 17 is located at a height consistent with the depth of plowing desired and in position to have an abrasive action on the bottom surface of the diagonal furrow slice as it leaves the deflector 14. The angular disposition of the wheel is adjusted to obtain the desired degree of penetration into the furrow slice and degree of soil pulverization, and is determined by the nature and condition of the soil.

Upon drawing the plow along the furrow, the wheel is rotated by the flow of the soil of the turning furrow slice, and requires no power drive. The speed of rotation increases as the center of force of the soil acting against the blades 19 is shifted upwardly toward the axis of rotation. Hence, to obtain a high speed, it is desirable to keep the ends of the blades 19 out of the furrow slice until they near the vertical center line of the wheel 17. The plow can be driven at much higher speeds than permissible with standard mold board plows since there is no pitching of soil at any speed. High speed plowing with good pulverization is highly desirable.

In acting on the slice, the wheel breaks up the soil and turns it over. The fast turning action of the flat blades 19 stirs the soil and lifts that portion of it adjacent the front face of the wheel and particularly between the blades above the normal height of the turned soil, thus aerating and spraying a substantial portion of the soil and assisting in covering up trash and vegetation.

The soil on the bottom of the slice flows through the wheel 17 between the blades 19, and is deposited in a relatively thick mulch, composed mostly of subsoil or soil adjacent the subsoil, in the bottom of the furrow being formed. The fertile soil of the next slice later upon being turned, pulverized and mixed with trash and vegetation, serves to bury the latter on and in the bottom mulch. As a result, rotting of the trash is promoted, and capillary action of the moisture is not prevented. The depth of the cushion of mulch may be varied by angularly adjusting the wheel 17 to vary the depth of penetration into the furrow slice.

In general it will be evident that the soil is worked from the bottom up instead of from the top down. Air pockets, so difficult to eliminate when present, are not formed, and any lumps that may remain are deposited on the top where they may be readily worked. The plowed soil is uniformly pulverized throughout its depth, and the action of the wheel 17 tends to level off the surface. By reason of the bottom mulch of subsoil, deep plowing is permissible.

The wheel 17 is self-cleaning, the flexing action of the blades 18 tending to prevent soil, trash or foreign particles from lodging permanently between them. The plow works satisfactorily in practically all kinds of soil. The wheel 17, the deflector 14 with the shield 57 and the mounting for the wheel constitute an attachment adapted to be mounted on practically all makes of standard plows.

I claim as my invention:—

1. In a plow, in combination with a frame, a plow share and a moldboard, a flat member rotatably mounted on said frame in position to act on the soil as it leaves said moldboard, said member being formed with radial cutting elements for disintegrating the soil.

2. In a plow, in combination with a frame, a plow share and a moldboard, a relatively flat member rotatably mounted on said frame back of said share in position to act at its lower portion on the soil as it leaves said moldboard, said member being foraminated and formed in its face with cutting projections.

3. In a plow, in combination, means for cutting, lifting and turning a furrow slice, and a free-turning toothed rotary member positioned in the path of the slice and driven by the flow of the soil.

4. In a plow, in combination, a frame, means on said frame for cutting, lifting and turning a furrow slice obliquely into an adjacent furrow, and a rotary wheel with peripheral blades mounted on said frame back of said means in position to disintegrate said slice.

5. In a plow, in combination, a frame, means on said frame for cutting, lifting and turning a furrow slice obliquely into an adjacent furrow, and a wheel with peripheral blades freely rotatable on said frame back of said means in position to disintegrate said slice, said wheel being driven by the flow of the soil.

6. In a plow, in combination, a frame, means on said frame for cutting, lifting and turning a furrow slice obliquely into an adjacent furrow, and a generally vertical rotary rimless wheel with radial blades mounted on said frame in the path of said slice.

7. In a plow, in combination, a frame, means on said frame for cutting, lifting and turning a furrow slice obliquely into an adjacent furrow, and a rotary rimless wheel with a relatively small hub and elongated radial blades mounted on said frame in position to penetrate and abrade the bottom of the diagonally turning slice.

8. In a plow, in combination, a frame, means on said frame for cutting, lifting and turning a furrow slice obliquely into an adjacent furrow, and a rotary wheel with resilient blades mounted on said frame for abrading the bottom of the turning slice.

9. In a plow, in combination, a frame, means on said frame for cutting, lifting and turning a furrow slice obliquely into an adjacent furrow, and a flat rotary wheel mounted back of said means on said frame, generally vertically and diagonally of the line of movement in position to penetrate and act on the bottom of the furrow slice.

10. In a plow, in combination, a frame, means on said frame for cutting, lifting and turning a furrow slice obliquely into an adjacent furrow, and a flat rotary wheel mounted back of said means on said frame, generally vertically and diagonally of the line of movement in position to penetrate and act on the bottom of the furrow slice, said wheel being adjustable vertically and angularly.

11. In a plow, in combination, means for lifting and turning a furrow slice, and a rotary, open-faced wheel back of said means, said wheel being mounted obliquely to the longitudinal dimension of the plow and with its lower portion in position to act on the slice, to disintegrate it.

12. In a plow, in combination, a frame, a plow share on said frame, a deflector in the nature of a moldboard mounted on said frame over and back of said share, and a rotary member with blades mounted on said frame back of said deflector, the forward edge of said member extending beyond the rearward edge of said deflector.

13. In a plow, in combination, a frame, a plow share on said frame, a deflector mounted on said frame over and back of said share, a rotary member with blades mounted on said frame back of said deflector, and a shield on said deflector overlapping the forward portion of said wheel.

14. In a plow, in combination, a frame, means on said frame for cutting, lifting and turning a furrow slice obliquely into an adjacent furrow, and a rotary wheel with removable peripheral blades mounted on said frame back of said means and obliquely to the line of movement in position to act at its lower portion on the slice, the central portion of the front face of said wheel being recessed.

15. In a plow, in combination, a frame, a plow share on said frame, a bracket mounted for pivotal adjustment about a horizontal axis on said frame, one end of said bracket being inclined laterally of said frame, an arm pivotally mounted on the inclined end of said bracket, said arm being formed with a longitudinal slot, a bearing shaft adjustably secured to said arm back of and in a plane above said share for adjustment along said slot, and a toothed rotary member rotatable on said shaft.

16. In a plow, in combination, a frame, means on said frame for cutting, lifting and turning a furrow slice into an adjacent furrow, and a rotary wheel mounted on said frame in a position to act on the bottom of said furrow slice whereby to return the sub-soil thereon to the bottom of the furrow.

17. In a plow, in combination, a frame, means on said frame for cutting, lifting and turning a furrow slice obliquely into an adjacent furrow, and a rotary wheel mounted on said frame in a position for abrading the bottom of the turning slice whereby to return the sub-soil to the furrow from which it was taken.

18. In a plow, in combination, a frame, means on said frame for cutting, lifting and turning a furrow slice, and a generally vertical rotary wheel journaled in said frame in back of said means, said wheel having individual spokes permitting passage of soil radially and axially of the wheel and being positioned diagonally of the furrow whereby initially to abrade the bottom of the furrow slice to remove the sub-soil and then to disintegrate the slice.

19. In a plow, in combination, a frame, a plow share and moldboard for cutting, lifting and turning a furrow slice, and a vertically disposed rotary member having spaced radial cutting elements acting on said slice while turning to disintegrate it.

20. In a plow, in combination, a frame, means on said frame for cutting, lifting and turning a furrow slice comprising a share and a deflector in the nature of a moldboard, a generally vertical, rotary, bladed wheel journaled in said frame back of said deflector, said wheel being positioned diagonally of the longitudinal dimension of the plow and extending forward beyond the rear edge of said deflector, and means for adjusting the diagonal position of said wheel and the vertical postion thereof whereby its effect on the turning furrow slice is varied.

OTTO B. CLARK.